J. G. BAUKAT.
CONTOUR INDICATING DEVICE.
APPLICATION FILED DEC. 14, 1916.

1,255,127.

Patented Feb. 5, 1918.
2 SHEETS—SHEET 1.

Inventor
John G. Baukat.
By Stanley Lightfoot
ATTORNEY

J. G. BAUKAT.
CONTOUR INDICATING DEVICE.
APPLICATION FILED DEC. 14, 1916.
1,255,127.
Patented Feb. 5, 1918.
2 SHEETS—SHEET 2.
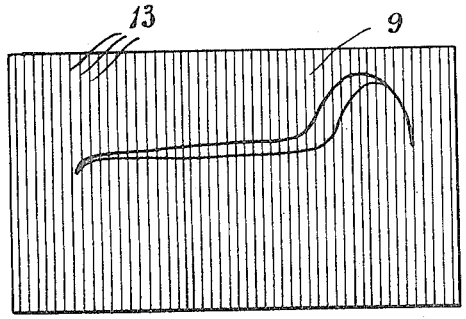
Fig. 5.   Fig. 6.
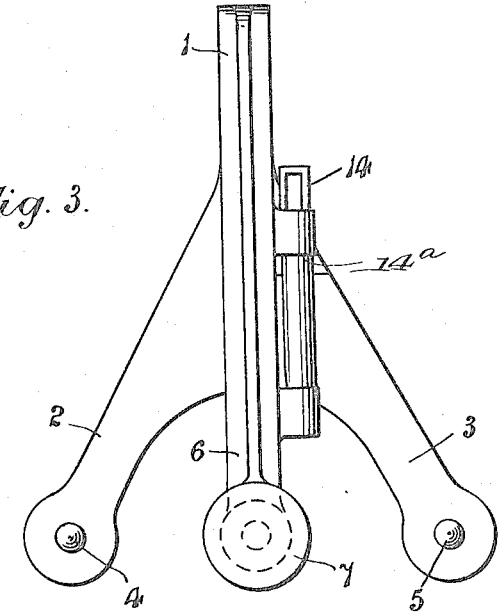  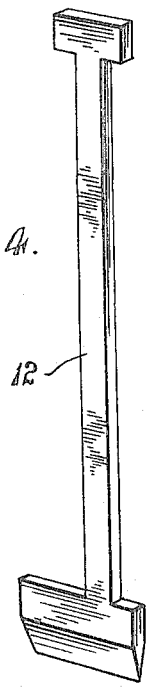
Fig. 3.   Fig. 4.
Inventor
John G. Baukat.
By Stanley Lightfoot
ATTORNEY.

UNITED STATES PATENT OFFICE.

JOHN G. BAUKAT, OF TORONTO, ONTARIO, CANADA.

CONTOUR-INDICATING DEVICE.

1,255,127.  Specification of Letters Patent.  Patented Feb. 5, 1918.

Application filed December 14, 1916.  Serial No. 137,035.

*To all whom it may concern:*

Be it known that I, JOHN G. BAUKAT, of the city of Toronto, in the county of York, in the Province of Ontario, in the Dominion of Canada, mechanical engineer, have invented certain new and useful Improvements in Contour-Indicating Devices, and do hereby declare that the following is a full, clear, and exact description of same.

This invention relates to contour indicating devices, and has for its objective to provide a device of a construction and subject to a manner of performance which will enable the securing of actual comparative records of wear or change in contour of objects, such as wheel tires or rails, said device being of simple construction and capable of easy operation by a person not necessarily skilled in the use of instruments of precision, a further object being to provide for ease in applying cards or such other objects, upon which a record is to be made, to the device.

Further objects subsidiary to or resulting from the hereinbefore mentioned objects or from the novel construction and arrangement of the device will become apparent and the invention is further disclosed in the specification.

In carrying my invention into effect I may provide a frame adapted to support a record card, in a desired position thereon, said frame having depending arms of a conformation adapted to extend over the article, the contour of which is to be recorded, said arms being provided with means to effect their engaging, either frictionally or otherwise, with said article, at certain predetermined positions, and a further arm or arms where necessary, to engage, by preferably adjustable means with another part or side of said article, for securing purposes, the said frame having associated therewith a plurality of movable contour indicating integers adapted to be brought into contact with the surface to be recorded and arranged that they may indicate by their position, with respect to the record card, the contour of the article, whereby such contour may be accurately traced upon said card, means, such as a gate carrying said indicating integers being also provided to admit of the temporary moving of said integers away from said card, to allow of ready access to the same; all of which is more particularly described and ascertained in and by the following specification, having reference to the accompanying drawings, in which:—

Fig. 3 is an end elevation of the same, the recording integers being omitted.

Fig. 4 is a detail view of one of the recording integers.

Fig. 5 is a card showing how the relative contours are comparatively depicted, and Fig. 6 indicates a form of system which may be emphasized in the reverse side of such a card to identify such contours.

Fig. 4 is drawn to a larger scale than the remaining figures of the drawings.

Similar characters of reference indicate similar parts in the several figures of the drawings.

Figure 1:
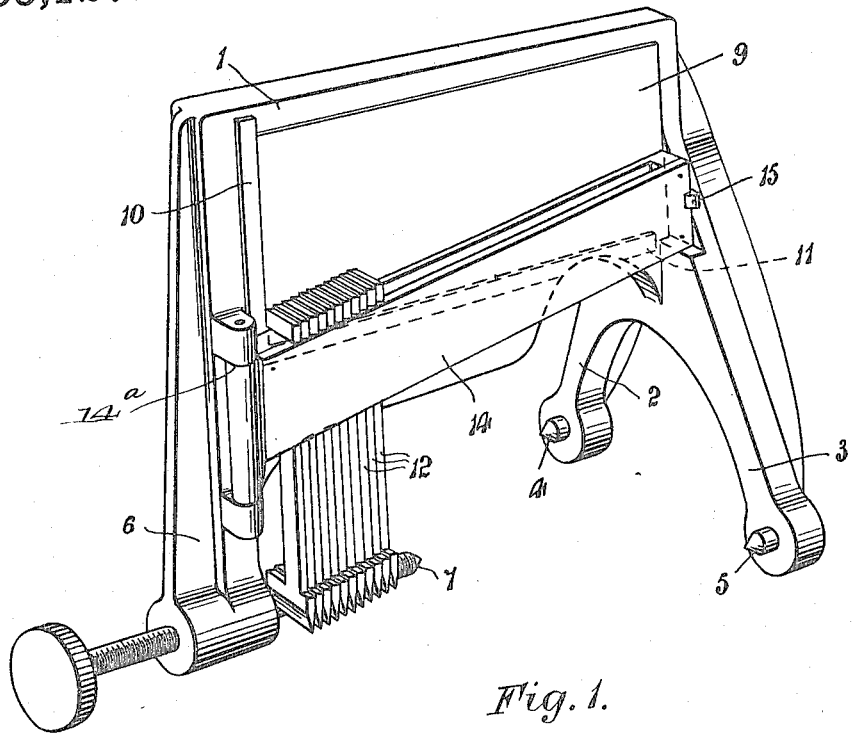
Figure 1 is a perspective view of a contour indicating device constructed in accordance with this invention, certain of the recording integers being omitted for purposes of clearness.
Figure 2:
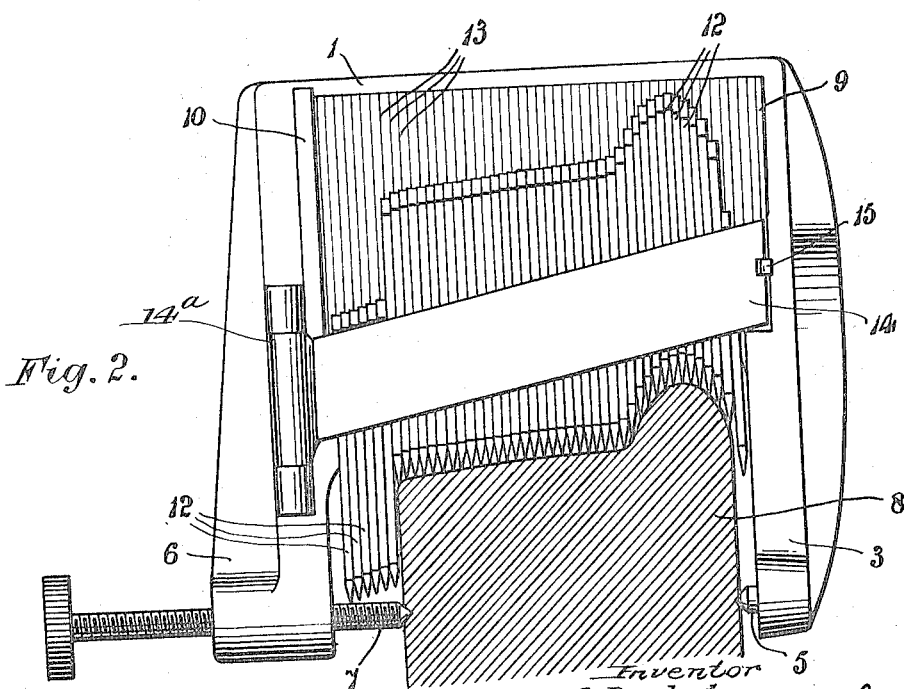
Fig. 2 is an elevation of the complete device.

The example illustrated shows a form of the device suitable for the recording of contours of wheels, and in this case 1 is a frame provided with depending arms 2 and 3, at one end thereof, having provided pins 4 and 5 thereon respectively, these pins being located upon the inner faces of the said arms. 6 is a further depending arm located at the opposite end of the said frame 1, this arm being provided with an adjustable pointed member 7, the dispositions of the said arms being such that they may receive the rim of a wheel therebetween and grip the same by the virtue of the adjustment of the position of the said adjustable pointed member 7 with respect to the said pointed pins 4 and 5. In Fig. 2 the section of a wheel rim is shown as designated by the reference numeral 8.

The frame 1 is adapted to support a record card 9, the position of which card is registered by raised straight-edges 10 and 11 secured to, or integral with, the said frame and 12, 12, are adjustable contour indicating integers slidably arranged with respect one to the other in such manner that the upper ends thereof will indicate, by the respective positions of their upper extremities on card 9, the respective positions of their lower ends, so that if the lower ends of the said indicating integers are brought into contact with the tread of a wheel, as shown in Fig. 2, then their upper ends will indicate upon the said record cards the contour of such points of contact. Thus a pencil or marker may be placed over the said record card at the upper ends of the said integers whereby accurate tracing the required contour upon the said card is obtained, as shown in Fig. 5 where two readings at different periods in the history of a wheel are illustrated.

For purpose of accuracy it is preferred that the said contour indicating integers should be of as thin a material as is consistent with the strength required therein, in order that as large a number of points of contact may be obtained as possible, but in the drawings these integers have been shown as of substantial thickness, for purposes of clear illustration, but it should be understood that such thick integers may be used if thought necessary or desirable, in which case it is preferable to employ lines 13, 13 upon the record card 9 across which lines the upper surfaces of the said integers will respectively extend, thereby indicating the actual relative position of the recorded points to the points of contact of the said integers with the surface of the said wheel or other article as will be readily understood.

To provide for easy access to the record card, and also to permit of the removal of the recording integers from the proximity of the wheel, or other article, to prevent possibility of damage to the integers by the said wheel or article being fitted in position, it is proposed to mount the said integers in a gate 14, hinged as at 14ª to the said frame or such other part of the device as may be desirable, 15 being a latch to effect the securing of the said gate against movement when the device is in use.

The suggested method of using the device is to provide the article, to be periodically tested as to contour, with certain fixed marks, such as small depressions of an indefaceable nature, with which the pointed members 4, 5 and 7 respectively may register, so that the device will at each testing be applied in the same location upon the wheel, or such article, as that in which it may have been previously applied when obtaining a prior contour reading. It will be seen that by the use of such a device the comparative contours taken at different periods in the history of a wheel, or other article, may be definitely shown upon the same card, whereby actual wear or change in character of the contour of such wheel or article may be readily and definitely ascertained and calculated.

This invention may be developed under the scope of the following claims without departing from the essential features of the said invention, and it is desired that the specification and claims be read as being merely illustrative and not in a limiting sense, except as necessitated by the prior art.

What I claim as my invention is:

1. In a contour indicating device, a frame adapted to be secured to an article, the contour reading of which is desired, a plurality of parallel contour indicating integers supported by said frame and slidable with respect one to another whereby they may be brought into contact with a surface to be recorded, said integers being so fashioned that they will indicate upon a record card, by their position, the position of the points of contact between said integers and said surface, and means supporting said card in juxtaposition to said integers.

2. In a contour indicating device, a frame, members depending from said frame to receive an article, the contour reading of which is desired, therebetween, means to effect the securing of said article in position, and a plurality of parallel contour indicating integers supported by said frame and slidable with respect one to another whereby they may be brought into contact with a surface to be recorded, said integers being so fashioned that they will indicate upon a suitable card by their position, the position of the points of contact between said integers and said surface to be read, said frame being adapted to support said card in a definite position with respect to said integers.

3. In a contour indicating device, a frame adapted to be applied to an article, the contour of which is to be ascertained, a recording surface carried by said frame, a gate pivotally mounted on the frame, a plurality of relatively movable contour indicating integers carried by the gate and means to hold the gate in closed position so that the outer ends of the integers will be in close proximity to the recording surface, whereby the contour of the article may be traced upon said surface.

4. In a contour indicating device, a record card carrying frame adapted to be secured to an article, the contour reading of which is desired, and a plurality of contour indicating integers movable with respect one to another and adapted to be brought into contact with a surface to be recorded, said integers being so fashioned that they will indicate upon said card, by their position, the position of the points of contact between said integers and said surface to be recorded, and a supporting member for said integers, said member being hinged to said frame, and adapted to normally bring said integers into juxtaposition with said card.

Signed at the city of Toronto, in the county of York, in the Province of Ontario, in the Dominion of Canada, this 12th day of December, 1916.

JOHN G. BAUKAT.